US007791017B2

(12) United States Patent
Stephenson et al.

(10) Patent No.: US 7,791,017 B2
(45) Date of Patent: Sep. 7, 2010

(54) METHOD TO SIMULTANEOUSLY DETERMINE PORE HYDROCARBON DENSITY AND WATER SATURATION FROM PULSED NEUTRON MEASUREMENTS

(75) Inventors: Kenneth E. Stephenson, Belmont, MA (US); John Barry Fitzgerald, Cambridge (GB)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/781,404

(22) Filed: Jul. 23, 2007

(65) Prior Publication Data
US 2009/0026359 A1    Jan. 29, 2009

(51) Int. Cl.
*G01V 5/08* (2006.01)
(52) U.S. Cl. .................................. 250/269.7
(58) Field of Classification Search .............. 250/269.7, 250/269.6
See application file for complete search history.

(56) References Cited

U.S. PATENT DOCUMENTS 4,577,102 A * 3/1986 Sherman et al. .......... 250/269.2
5,055,676 A * 10/1991 Roscoe et al. ............ 250/269.7
5,259,239 A * 11/1993 Gaisford .................... 73/61.44
5,532,482 A   7/1996 Stephenson
5,900,627 A * 5/1999 Odom et al. ............. 250/269.7
6,732,796 B2  5/2004 Vinegar et al.
6,761,216 B2  7/2004 Vinegar et al.
6,769,485 B2  8/2004 Vinegar et al.
6,805,195 B2 10/2004 Vinegar et al.
7,117,092 B2 * 10/2006 Jacobson ....................... 702/8
7,587,373 B2 *  9/2009 Smith et al. ................... 706/16
2004/0248314 A1 12/2004 Stephenson et al.
2007/0143021 A1 * 6/2007 Griffiths et al. ................. 702/6

OTHER PUBLICATIONS

Morris et al., Differentiation of Gas in Sand/Shale Environments Using Pulsed Neutron Capture Measurements, SPE 38703, 1997, pp. 511-523.

(Continued)

*Primary Examiner*—David P Porta
*Assistant Examiner*—David S Baker
(74) *Attorney, Agent, or Firm*—Vincent Loccisano; James McAleenan; Brigid Laffey (57) ABSTRACT

A method comprising using inelastic and capture gamma-ray count rates from two detectors in a borehole logging tool and determining formation water saturation. In this method the formation water saturation is determined without prior knowledge of the carbon density in the pore hydrocarbons.

7 Claims, 9 Drawing Sheets

OTHER PUBLICATIONS

Odom et al., Improvements in a Through-Casing Pulsed-Neutron Density Log, SPE 71742, 2001, pp. 1-9.

Odom et al, Log Examples with a Prototype Three-Detector Pulsed-Neutron System for Measurement of Cased-Hole Neutron and Density Porosities, SPE 71042, 2001, pp. 1-10.

Odom et al., Applications and Derivation of a New Cased-hole Density Porosity in Shaly Sands, SPE 38699, 1997, pp. 475-487.

Herron et al., Log Interpretation Parameters Determined from Chemistry, Mineralogy and Nuclear Forward Modeling, Proceedings 1997 International Symposium of the Society of Core Analysts, Sep. 8-10, Calgary Paper SCA-9727, pp. 1-14.

Herron et al., Application of Nuclear Spectroscopy Logs to the Derivation of Formation Matrix Density, Paper JJ Presented at the 41st Annual Logging Symposium of the Society of Professional Well Log Analysts, Jun. 4-7, 2000, Dallas, Texas, pp. 1-12.

Herron et al., Real-Time Petrophysical Analysis in Siliciclastics From the Integration of Spectroscopy and Triple-Combo Logging, SPE 77631, 2002, pp. 1-7.

Hakes, Long Term World Oil Supply, Energy Information Administration, 2000, http://tonto.eia.doe.gov/FTPROOT/ petroleum/ LongTermOilSupplyPresentation.ppt, retrieved Jun. 11, 2008, Slides 1-20.

Webster et al., Multiphase Well Surveillance with a Permanent Downhole Flowmeter, SPE 90024, 2004, pp. 1-8.

Stephenson, High Pressure 4HE Proportional Counters as Borehole Detectors of MEV Neutrons, IEEE, 1995, pp. 802-806.

* cited by examiner

OPEN HOLE LOG

METHOD TO SIMULTANEOUSLY DETERMINE PORE HYDROCARBON DENSITY AND WATER SATURATION FROM PULSED NEUTRON MEASUREMENTS

FIELD OF THE INVENTION

The present invention relates to the downhole measurement of substances in earth formations surrounding an earth borehole.

BACKGROUND OF THE INVENTION

Neutron generators based on the deuteron-triton fusion reaction produce neutrons at an energy slightly over 14 MeV. At this energy, the probability of scattering from hydrogen is greatly reduced from that at epithermal energy, while the probability of inelastically scattering from heavier nuclei, like silicon, calcium, carbon and oxygen is greatly increased from that at lower energy. Consequently, scattering and energy loss are not dominated by hydrogen until the energy of the neutrons drops to approximately 6 MeV. By that time, the slowing down length ($L_h$) of the neutrons has already been heavily influenced by inelastic scattering. Thus, the transport of high energy neutrons is determined not only by hydrogen index, but also, to a large degree, by the density of inelastic scatterers and the inelastic scattering cross section of these nuclei. The slowing down of high energy neutrons relevant to inelastic scattering can be described by the ($L_h$) from 14 MeV to 1 MeV, which is similar to the conventional slowing down length ($L_s$), except that the latter extends down to thermal energy. In simple one-group infinite-media diffusion theory, the neutron flux at 1 MeV is proportional to $$\frac{e^{\frac{r}{L_h}}}{r},$$

where r is the distance from the neutron source, and the inelastic gamma-ray production will have, approximately, this spatial dependence. Since the detection probability is high when the gamma-rays are produced close to the detector, the detection rate for detectors at distances $r_n$ and $r_f$ from the neutron source (where $r_n$ is the distance to the near detector and $r_f$ is the distance to the far detector) will be modulated by $$\frac{e^{\frac{r_n}{L_h}}}{r_n} \text{ and } \frac{e^{\frac{r_f}{L_h}}}{r_f},$$

respectively. (1 MeV is approximately the lowest energy at which inelastic scattering is possible.) The ratio of detection rates will then vary as $$\frac{r_f}{r_n} e^{\frac{(r_f - r_n)}{L_h}}.$$

For a small slowing down length increase $\Delta L_h$, the ratio of detection rates decreases at a rate proportional to $\Delta L_h / L_h^2$. Since $L_h$ varies little with (liquid filled) porosity, it is expected that the near:far inelastic gamma-ray ratio would also have little dependence on porosity. Note that this also implies that the near:far inelastic ratio would have no direct dependence on bulk formation density, since this varies with porosity. Of course, if the density of inelastic scatterers were to vary, then $L_h$ and the near:far inelastic ratio would also vary. But this typically does not happen unless the lithology changes, such as from a sandstone to a shale.

The density of inelastic scatterers (e.g., carbon or oxygen) will decrease, however, if high density liquid is removed from pores and replaced with low density vapor. Such a change will cause $L_h$ to increase and the near:far inelastic ratio to decrease. These changes can be used to measure the density of the pore fluid, given that the formation porosity is known independently.

In cased hole there are many nuclear techniques but most of them involve testing for the presence of hydrogen in the pores.

U.S. Pat. No. 6,805,195B2 to Vinegar, et al. discloses that a hydrocarbon containing formation may be treated using an in situ thermal process. A mixture of hydrocarbons, $H_2$, and/or other formation fluids may be produced from the formation. Heat may be applied to the formation to raise a temperature of a portion of the formation to a pyrolysis temperature. After pyrolysis, the portion may be heated to a synthesis gas production temperature. A synthesis gas producing fluid may be introduced into the portion to generate synthesis gas. Synthesis gas may be produced from the formation in a batch manner or in a substantially continuous manner.

Likewise, U.S. Pat. No. 6,769,485B2 to Vinegar, et al. discloses that a coal formation may be treated using an in situ thermal process. Hydrocarbons, $H_2$, and/or other formation fluids may be produced from the formation. Heat may be applied to the formation to raise a temperature of a portion of the formation to a synthesis gas production temperature. A synthesis gas producing fluid may be introduced into the formation to generate synthesis gas. Production wells may be operated at selected temperatures to obtain a desired synthesis gas composition.

Similarly, U.S. Pat. No. 6,761,216B2 to Vinegar, et al. discloses that a coal formation may be treated using an in situ thermal process. A mixture of hydrocarbons, $H_2$, and/or other formation fluids may be produced from the formation. Heat may be applied to the formation to raise a temperature of a portion of the formation to a pyrolysis temperature. After pyrolysis, the portion may be heated to a synthesis gas production temperature. A synthesis gas producing fluid may be introduced into the portion to generate synthesis gas. Synthesis gas may be produced from the formation in a batch manner or in a substantially continuous manner.

In addition, U.S. Pat. No. 6,732,796B2 to Vinegar, et al., discloses that a hydrocarbon containing formation may be treated using an in situ thermal process. A mixture of hydrocarbons, $H_2$, and/or other formation fluids may be produced from the formation. Heat may be applied to the formation to raise a temperature of a portion of the formation to a pyrolysis temperature. A portion of a formation may be heated from a plurality of heat sources to a temperature sufficient to allow generation of a first synthesis gas having a low $H_2$ to CO ratio. A second portion of a formation may generate synthesis gas having a $H_2$ to CO ratio greater than the first synthesis gas. A portion of the first synthesis gas may be blended with a portion of the second synthesis gas to produce a blend synthesis gas having a desired $H_2$ to CO ratio.

SUMMARY OF THE INVENTION

In general, a method is disclosed. The method comprises using gamma-ray count rates from two detectors in a borehole logging tool, determining formation saturation of a first fluid using the gamma-ray count rates, determining formation saturation and density of a second fluid using said gamma-ray count rates and transmitting the saturation of the first fluid and the formation saturation and density of the second fluid to a surface receiver. In another aspect, the method may also comprise separating the second fluid into the volume fraction of the two phases. In another aspect, the second fluid may be a mixture of oil and hydrocarbon and the method may further comprise determining the water saturation of the first fluid. In another aspect, the first fluid may be oil and the second fluid may be a mixture of liquid and vapor water. In another aspect, the borehole is filled with air or gas, the method further comprising receiving a hydrogen sensitive signal. In another aspect, the hydrogen sensitive signal is received by one or more thermal neutron detectors. In another aspect, the hydrogen sensitive signal is received by a near:far gamma ray ratio.

In general, another method is disclosed. The method comprises using inelastic and capture gamma-ray count rates from two detectors in a borehole logging tool; determining formation water saturation; and transmitting the formation water saturation to a surface receiver. In another aspect, the method further comprises determining pore hydrocarbon density. In another aspect, the method further comprises determining formation water saturation and pore hydrocarbon density from a near:far inelastic gamma-ray ratio and a ratio of the carbon inelastic yield to a normalization inelastic yield. In another aspect, the normalization element is selected from the group comprising oxygen, silicon, calcium, iron. In another aspect, the normalization element is a combination of elements selected from the group comprising oxygen, silicon, calcium, iron. In another aspect, the method further comprises deriving the pore carbon density from a near:far inelastic gamma-ray ratio and a ratio of the carbon inelastic yield to a normalization inelastic yield. In another aspect, the normalization element is selected from the group consisting of oxygen, silicon, calcium, iron. In another the normalization element is a combination of measured elements selected from the group consisting of oxygen, silicon, calcium, iron. In another aspect, a hydrocarbon ratio is derived by measuring neutron porosity, measuring true porosity and capturing spectroscopy data. In another aspect, the method further comprises deriving true porosity from inelastic ratios.

In general, an apparatus is disclosed. The apparatus comprises a borehole logging tool, and at least two detectors in the borehole logging tool for receiving gamma ray counts. The gamma ray counts are used to determine the formation saturation of a first fluid and the determining formation saturation and density of a second fluid. In another aspect, the volume fraction of the two phases of the second fluid is calculated. In another aspect, the water saturation of the first fluid is determined when the second fluid is a mixture of oil and hydrocarbon.

Further features and advantages of the invention will become more readily apparent from the following detailed description when taken in conjunction with the accompanying drawings.

DETAILED DESCRIPTION

Figure 1:
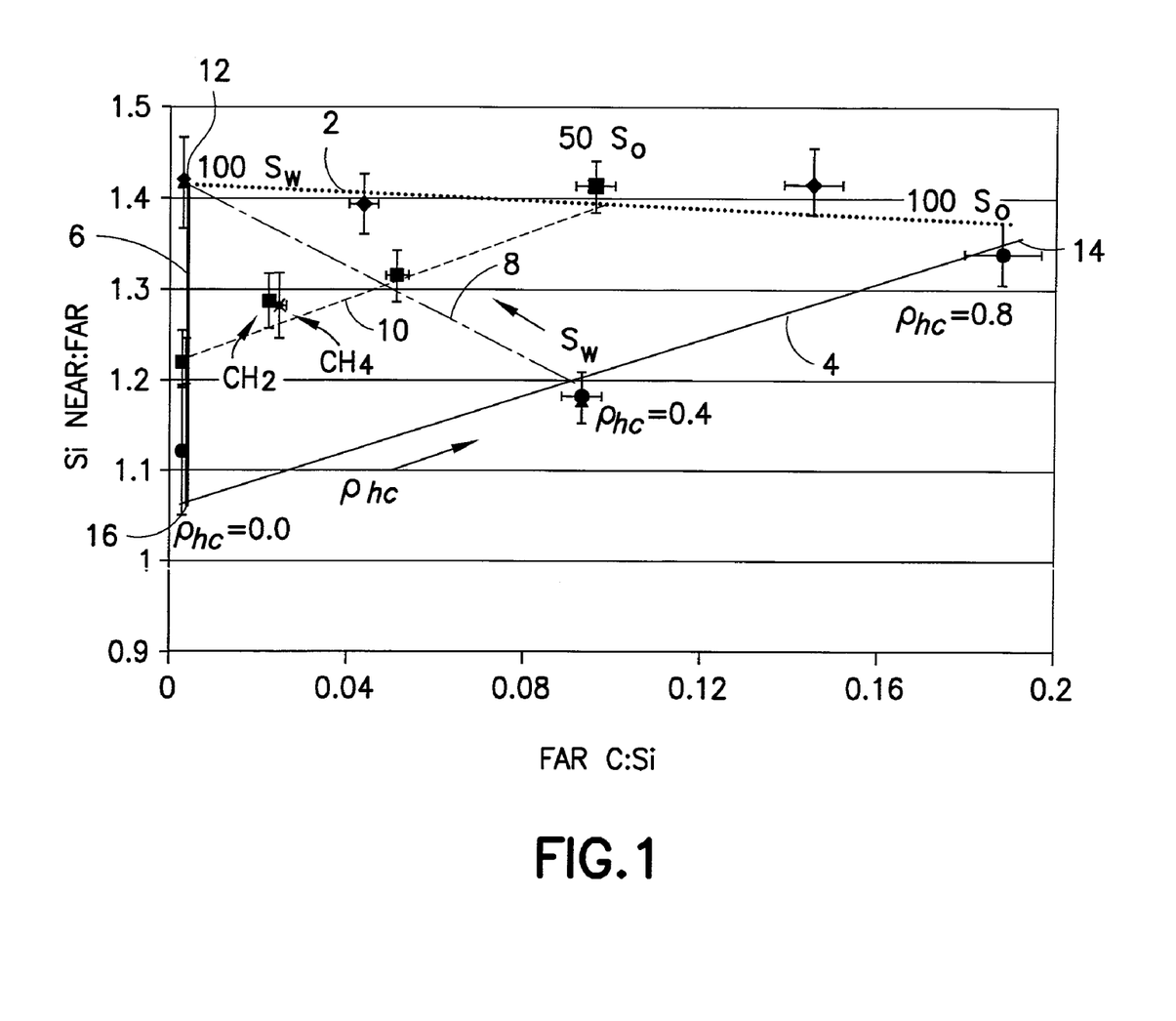
FIG. 1 is a chart comparing the CH4 calculation to the CH2 calculation at the same hydrocarbon density, 0.2 g/cm3.

In tools such as the Reservoir Saturation Tool (RST™), spectral decomposition provide the ability to calculate ratios of inelastic gamma-rays which originate from a given element, such as silicon or calcium. Gamma-rays that originate from these types of elements occur mostly in the formation and sample the neutron transport in the formation, rather than transport in the borehole, and are therefore more sensitive to the pore fluid density. The neutron transport was modeled with the Monte Carlo N-Particle (MCNP) transport code. A post processor for the MCNP output was used to identify inelastic gamma-rays by element for an RST™ model and the near:far ratio of inelastic gamma-rays from silicon was calculated. Also, to derive a signal proportional to the density of carbon in the pore fluid, the ratio of inelastic gamma-rays from carbon and silicon in the far detector was calculated. The function of silicon in this case is to normalize carbon. These MCNP calculations were performed for a 34 pu sandstone formation with varying water saturation amounts, hydrocarbon densities and hydrocarbon C/H ratios. The borehole is water filled. The results are shown in FIG. 1. The error bars represent Monte Carlo statistical uncertainties.

The data points along line 2 are 100% liquid but with varying water saturation $S_w$ from 100% to 0% ($S_o$ consisting of CH2 varying from 0% to 100%). Data points along line 4 represent varying CH2 density but zero water saturation. Points along line 6 represent varying fractions of water and void. Points along dotted line 8 represent varying CH2 density (0, 0.2, 0.4 and 0.8 g/cm3) at 50% water saturation, except for one point that is CH4 at 0.2 g/cm3. Points along the line dotted 10 represent varying water saturation with CH2 hydrocarbon at 0.4 g/cm3. It should be clear from the plot that, assuming that the maximum hydrocarbon density is 0.8 g/cm3, the three points of 100% water 12, 100% hydrocarbon 14 at $\rho_{hc}$=0.8 g/cm3 and the void point 16 at $S_w$=0, $\rho_{hc}$=0.0 g/cm3 represent three points of a triangle which should enclose all log points at 34 pu. Lines parallel to line 4 and line 8 represent fixed water saturation with hydrocarbon density varying along the line. Lines which originate at the 100% water saturation point and terminate anywhere on the 0% water saturation line 4, such as line 10, represent fixed hydrocarbon density and varying water saturation. The position of any point within the triangle can be expressed in terms of the water saturation and hydrocarbon density by simple proportioning along the water saturation and hydrocarbon density directions.

At porosities other than 34 pu, the near:far ratios at 100% water saturation and 100% hydrocarbon saturation, $\rho_{hc}$=0.8 g/cm3 points change little. However, the void point 16 will change with porosity such that the fractional difference between 100% water saturation and 100% void will scale with porosity (becoming 0, of course, at 0 pu). The ability to determine fluid density is greater if the porosity is large.

In FIG. 1, the CH4 calculation is compared to the CH2 calculation at the same hydrocarbon density, 0.2 g/cm3. The hydrogen density of the CH4 is 1.8 times as large at that in the CH2 calculation yet, within statistics, the near:far silicon ratio is the same for the two cases. This illustrates the insensitivity of near:far inelastic ratios to hydrogen.

One could specify carbon density in FIG. 1 rather than hydrocarbon density by scaling the CH2 hydrocarbon density values by approximately 6/7, the ratio of carbon atomic weight to the molecular atomic weight of CH2. For the case of CH4, the ratio is not very different: 6/8. Since most hydrocarbon fluids fall between these two extremes, one can, with little error, simply use a scale factor of approximately 6/7.5 to convert between hydrocarbon and carbon density.

The C/H atomic ratio is proportional to the ratio of the pore hydrocarbon carbon density and the pore hydrocarbon hydrogen density:

$$C/H = \frac{1}{12}\frac{\rho_C}{\rho_H} \quad (1)$$

The pore hydrocarbon hydrogen density is proportional to the hydrogen index of the pore hydrocarbons:

$$\rho_H = \frac{1}{9}HI_{hc} \quad (2)$$

The hydrogen index (HI) is defined as the fraction of hydrogen in a given volume relative to that if the volume were filled with water. The neutron porosity, which can be derived by several different logging instruments including the RST™, is an approximation to the HI of the entire formation, $HI_f$. The HI of the pore hydrocarbons can be derived from HIf but it should be corrected for hydrogen in the matrix and pore water:

$$HI_{hc} = \frac{HI_f - (1-\phi)HI_m - \phi S_w}{\phi(1-S_w)} \quad (3)$$

where $\phi$ is the true porosity. True porosity can be obtained from open hole data or from the RST™ or similar techniques. The rock matrix hydrogen index, $HI_m$, can be calculated from capture spectroscopy data.

Figure 2:
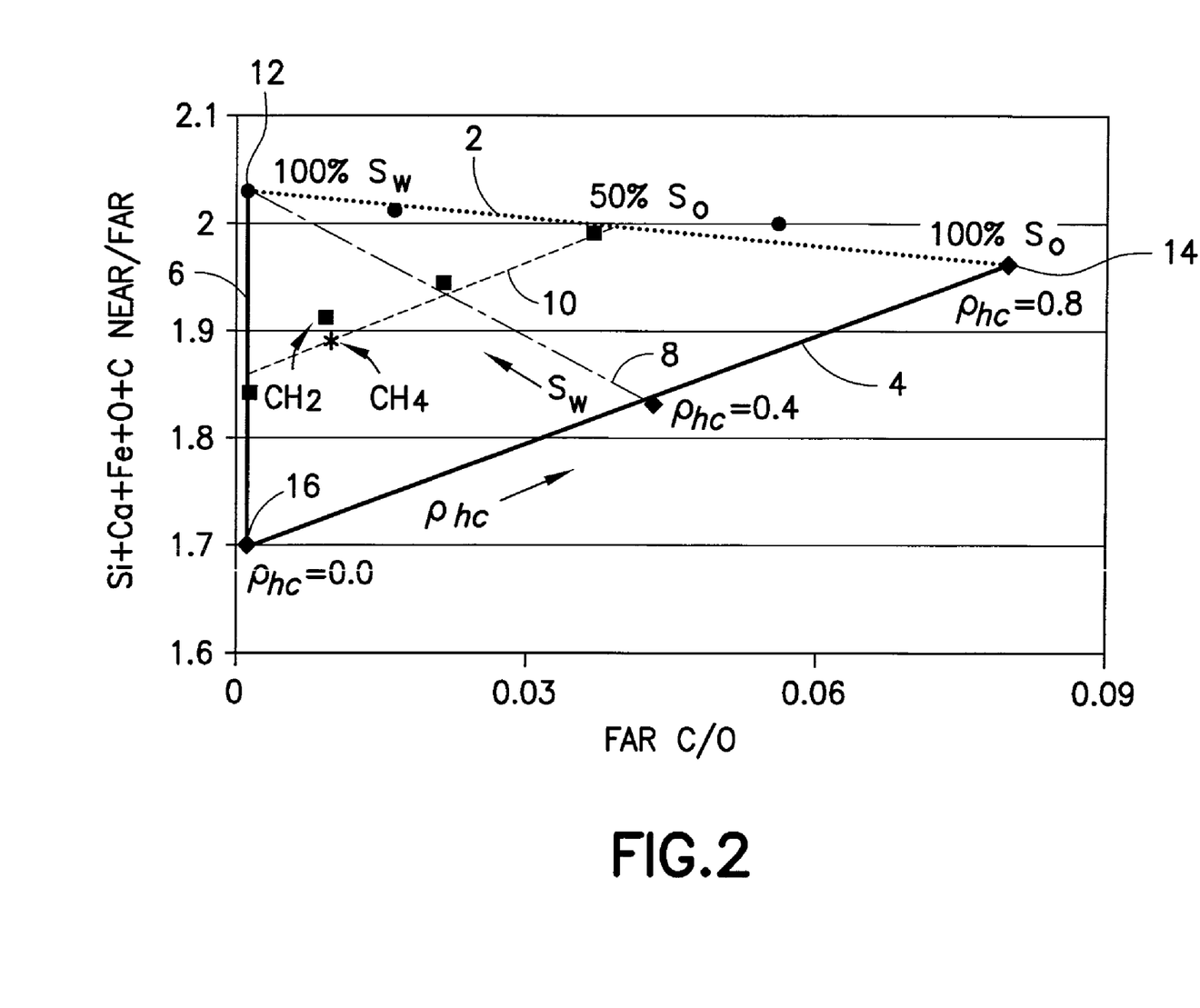
FIG. 2 is a chart of the near:far ratio of a combination of inelastic gamma-rays.

The silicon near:far inelastic ratio has good sensitivity; approximately 30% change from 100% water to 100% void at 34 pu. However, the current RST™ has a very large amount of fast epithermal capture background in the detectors ("tool background") and, as a result, the fitted silicon yield has poor precision. To improve precision, although at the expense of sensitivity, gamma-rays from other elements can be added to those from silicon to form the near:far ratio. Precision could also be improved by using detectors with less epithermal capture background. Gamma-rays from any elements which have sensitivity to high energy neutron transport (even though it may be small) in the formation are acceptable, including calcium in carbonates, oxygen and iron. In FIG. 2, the near:far ratio of a combination of inelastic gamma-rays has been calculated in a format similar to FIG. 1. Also, instead of using the ratio of inelastic carbon to inelastic silicon to measure the carbon content, the ratio of inelastic carbon to oxygen in the far detector is used to improve precision. While the precision in the near:far ratio is much better, the sensitivity from $S_w$=100% to 100% void is only about half that for the pure silicon case. Since C/O is conventionally used to determine water saturation, it might be thought that the oxygen signal has particular sensitivity to formation water. In fact, relatively little of the oxygen signal comes from the pore fluid, especially if the borehole is water filled. The weight fraction of oxygen in just about any rock matrix is about 0.5, meaning that most of the oxygen signal comes from rock matrix and borehole water. Consequently, there is only a minor change in oxygen gamma-ray production even for 100% changes in water saturation. As it is used here, oxygen functions mainly as a normalization to the carbon yield.

LOG EXAMPLE

Figure 3:
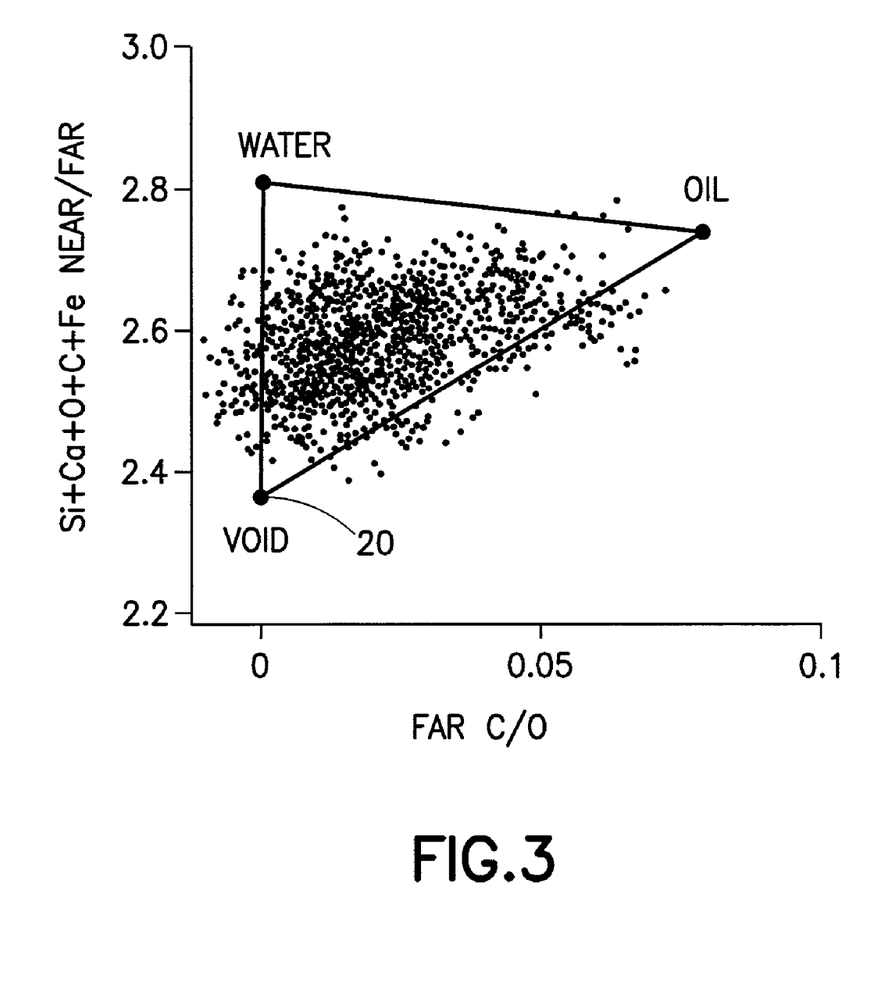
FIG. 3 is a chart of the near:far ratios for water and oil.

The bit size was 21.59 cm and the well was cased with 17.78 cm, 13.154 kilograms/30.48 cm casing. The water and oil points for bit size 21.59 cm and 17.78 cm 14.969 kilograms/30.48 cm casing were used. Near:far ratios for these are shown in FIG. 3. The void point 20 was calculated by using a decreasing the water point by 16%, which is the sensitivity determined from Monte Carlo. As can be seen, most of the log points fall within the triangle, although a few fall outside which is expected due to statistical fluctuation. This triangle is calculated for 34 pu and, because a true porosity log was not available, all data points of the log are plotted on this triangle regardless of the actual porosity, which was in many cases less than 34 pu. In principle, a different triangle is needed for each data point, calculated based on the porosity at that data point. The primary effect of using too large a porosity value is to make the water saturation too high. However, this does not cause a problem in interpreting the data, as seen in FIG. 4.

In addition to the RST™ inelastic/capture run, open hole logs were taken in this well. A comparison between the hydrocarbon density and water saturation derived from the method in this invention and the conventional open hole interpretation is shown in FIG. 4.

Figure 4:
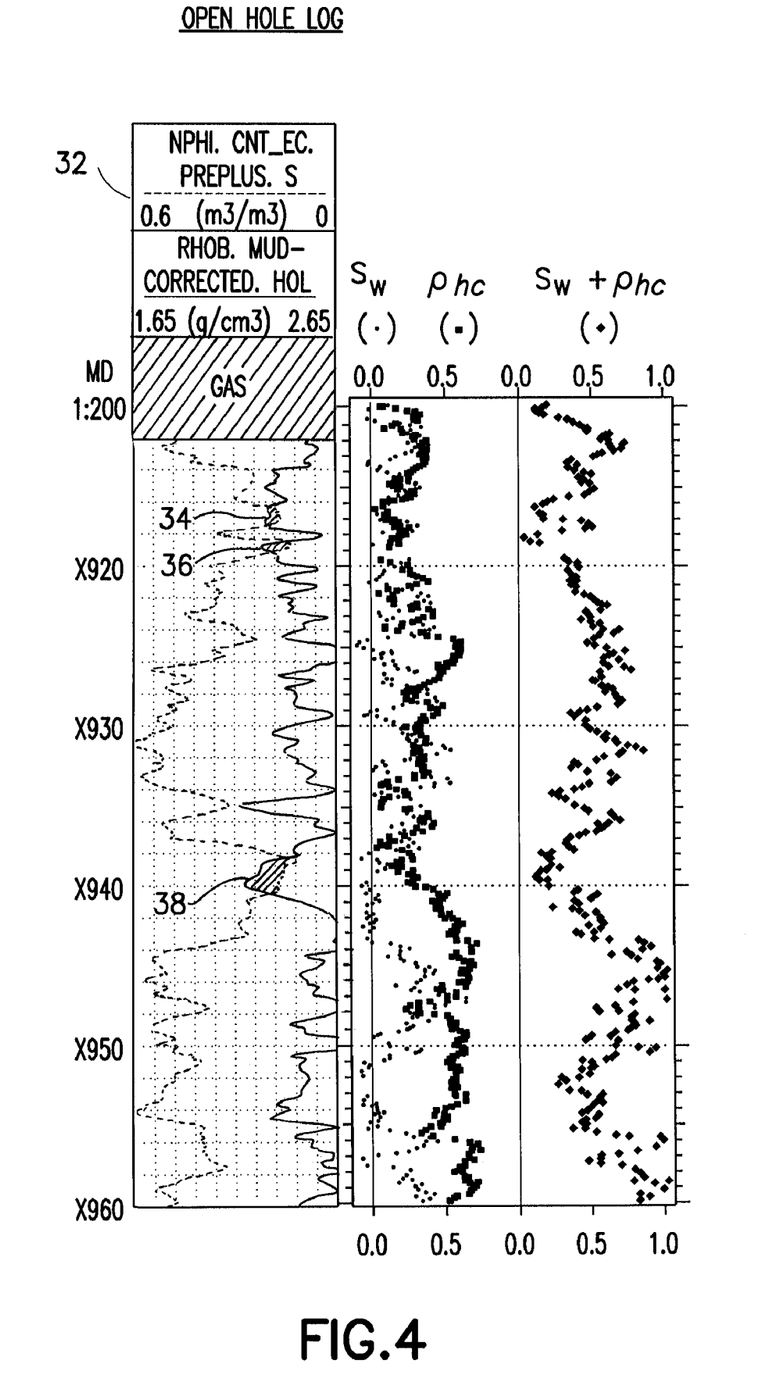
FIG. 4, a comparison between the hydrocarbon density and water saturation derived from the method in this invention and the conventional open hole interpretation is shown.

In FIG. 4, the neutron/density "crossovers" 34, 36, 38 are shaded on the open hole log 32. The crossovers 34, 36, 38 nearx917 m 34, x919 m, and x938 m-x940 m are indicators of low density, low hydrogen index pore fluid ("gas"). Low density fluid is indicated by simultaneously low water saturation and low hydrocarbon density on the RST™-derived plots. These conditions are easiest to see with the sum of $S_w$ and $\rho_{hc}$, which is small when $S_w$ and $\rho_{hc}$ are both small. It can be seen that this is, indeed, the case at these depths. The entire zone at x947-x938 m has a classic water, oil and gas structure, with oil overriding the water and gas overriding the oil. The high water saturation at x947 m and ending at x944 m is echoed in the open hole resistivity. The bottom 5 m of this interval contain high density hydrocarbon (presumably liquid oil). Above this, the hydrocarbon density decreases, suggesting a progressively greater fraction of vapor compared to liquid. Given information about the PVT properties of the hydrocarbon fluid (bubble point, density and molecular weight of the flashed oil), the vapor and liquid hydrocarbon saturations could be derived from the hydrocarbon density.

Turning again to FIG. 2, it was shown that pore hydrocarbon density, along with water saturation could be determined in an oil well from the near:far ratio of inelastic count rates and the ratio of carbon and oxygen count rates. The type of formation assumed in this model is one in which the hydrocarbon consists of both light and heavy molecular components, with the possibility that some of the light components form a vapor phase. The vapor and liquid hydrocarbon have a combined average density. In this interpretation model, lines parallel to the oil-void line 4 represent lines of different water saturation. Lines originating at the water point 12 and fanning out to the oil-void line 4 represent lines of different average hydrocarbon density. With the hydrocarbon density, along with pressure, temperature and some information about the Pressure-Volume-Temperature (PVT) properties of the hydrocarbons, one can estimate the vapor and liquid fractions of the hydrocarbon fluid.

Figure 5:
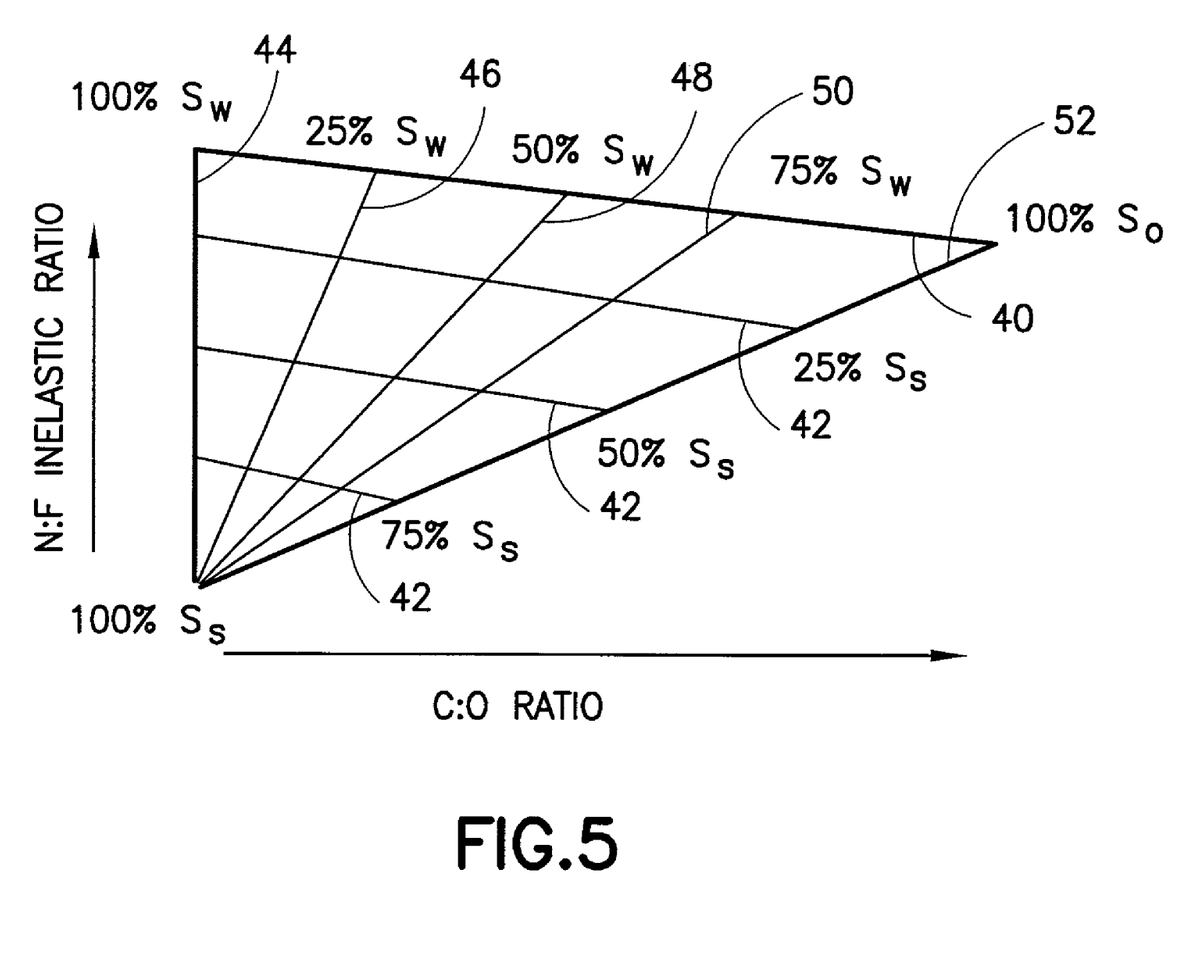
FIG. 5 is a plot of a model for a steam-injected heavy oil formation.

The interpretation model for a steam-injected heavy oil formation is different. Typically the vapor in the problem is steam. The comparable plot for this case is shown in FIG. 5.

The corners of the triangle are the same as in FIG. 3. Lines 42 parallel to the oil-water line 40 now represent different steam saturations. Lines 44, 46, 48, 50, 52 originating at the 100% steam point and fanning out toward the oil-water line 40 represent lines of different oil and water fractions of the liquid. Water, oil and steam fractions can be calculated for any point within the triangle from the proportionate distance along these lines.

Figure 6:
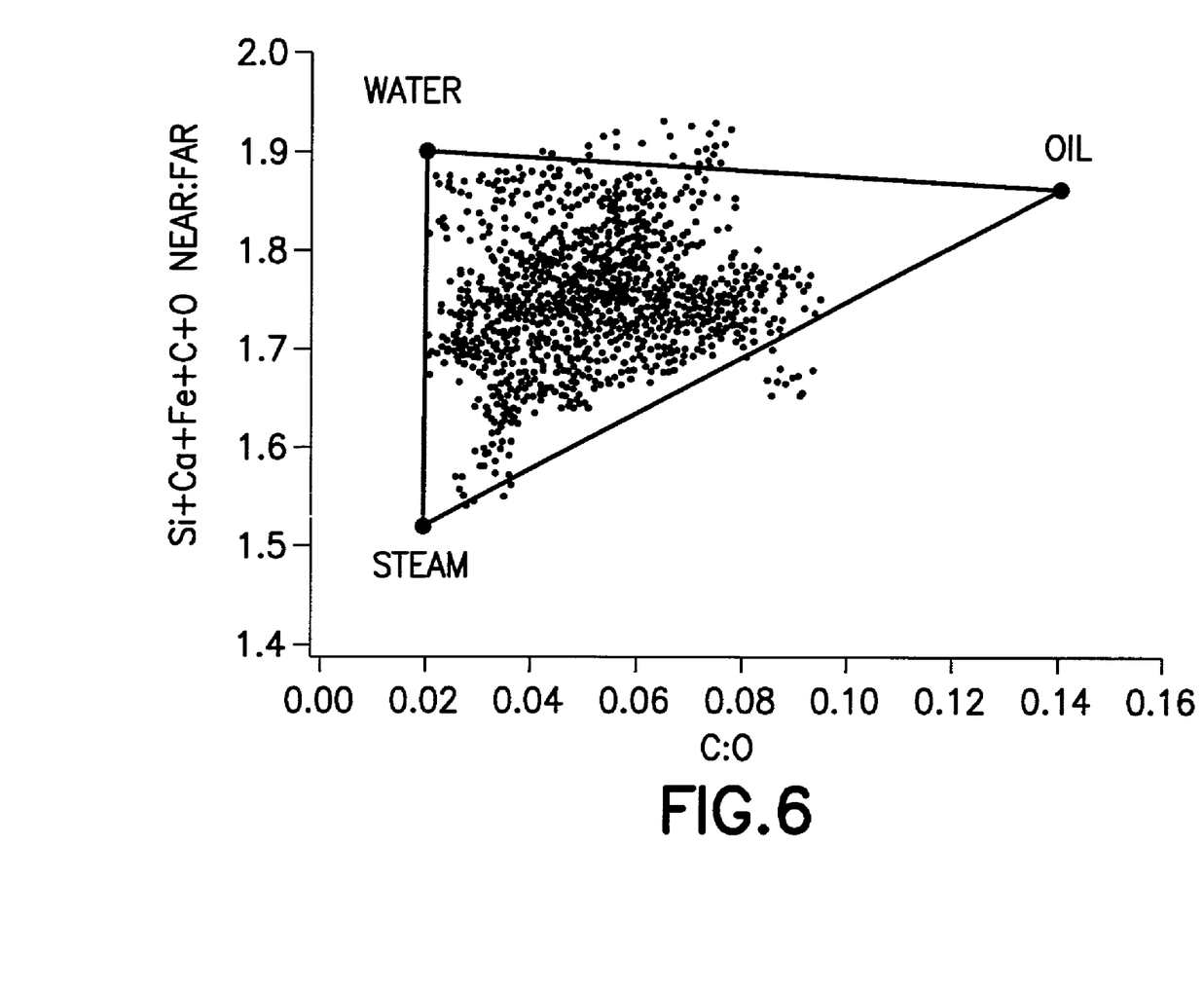
FIG. 6 is a triangle plot of a well log in a steam flooded formation is shown.

As an example of this method, the triangle plot of a well log in a steam flooded formation is shown in FIG. 6.

Figure 7:
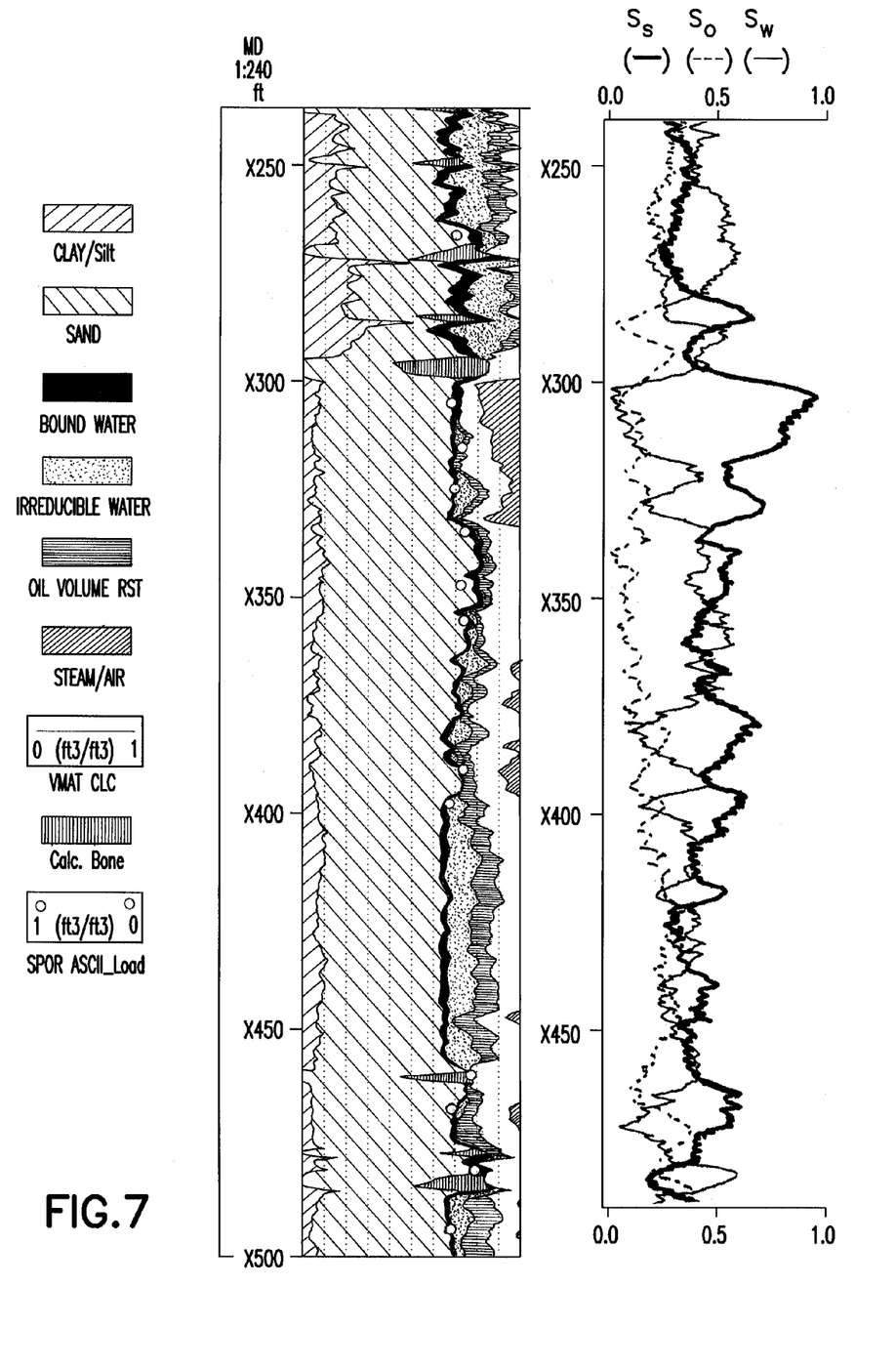
FIG. 7 is a plot of the Values of SS (steam saturation), $S_o$ and $S_w$ derived from this plot are shown to compare with some of the open hole and Reservoir Saturation Tool (RST™) logs and the ELAN™ interpretation.

Values of SS (steam saturation), $S_o$ and $S_w$ derived from this plot are shown in FIG. 7 to compare with some of the open hole and RST™ logs and the ELAN™ interpretation.

It is seen that the interpretation from the triangle plot gives large steam saturations in the x300-x340 m region, as does the Elemental Analysis (ELAN™) interpretation. The advantage to the RST™ triangle interpretation, however, is that it is produced with just the RST™ and allows a simple technique to monitor steam movement over time behind casing.

Another application is the gas-filled borehole. In liquid-filled boreholes, many 14 MeV neutrons from the source collide with either hydrogen or oxygen (carbon for an oil-filled borehole) in the borehole, having the effect of reducing the travel length of the neutrons. In a gas-filled borehole, the neutrons rarely collide with nuclei in the low density gas and, consequently, the neutrons travel a longer distance than in the liquid-filled case. The effect in the gas-filled case is to make the high energy neutron cloud larger and more diffuse than in the liquid-filled case. Additionally, since neutrons now travel far more easily through the low-density borehole than through the formation, the neutron population close to each detector is more heavily dominated by borehole transport (which is not sensitive to formation properties) than by transport through the formation. In the case of a very large borehole, the neutron cloud is very large, much bigger than the spacing of the near and far detectors, and the neutrons reaching the neighborhood of each detector have predominantly traveled through the borehole; consequently the detectors sense essentially the same gamma-ray flux. The sensitivity of the near:far ratio to changes in pore fluid density is then very small. For conventional borehole sizes, the near:far ratio for a gas-filled borehole will have some sensitivity to pore fluid density but not as much as for a liquid-filled borehole. To achieve a larger sensitivity to pore fluid density, the spacing between near and far detectors can be increased. It is noted that increasing the detector spacing can reduce the statistical precision of the measurement. Ideally, the spacing between the near and far detectors should be maximized for the acceptable (predetermined) statistical precision for the measurement. This will depend on the nature of the detectors used, the measurement made, and the borehole environment as well as the user's tolerance to error. The new, larger, far detector spacing will be referred to as "distant" (or "d") to distinguish it from the standard far detector spacing. Two different sets of calculations were run with pore fluids consisting of CH1.45 and CH0.55, combined in various proportions (including 0% and 100%) with fresh water. The pore void fraction was also varied. The modeled inelastic near far count rate ratios were used as before (cf FIG. 1 above) and plotted against far C:O ratio. Note that the C:O ratio can be measured at any detector, since both elements in this example are measured at the same location and therefore transport effects are eliminated. Choice of detector for this parameter might be determined by statistical precision (depends on neutron flux) and detector performance properties.

Figure 8:
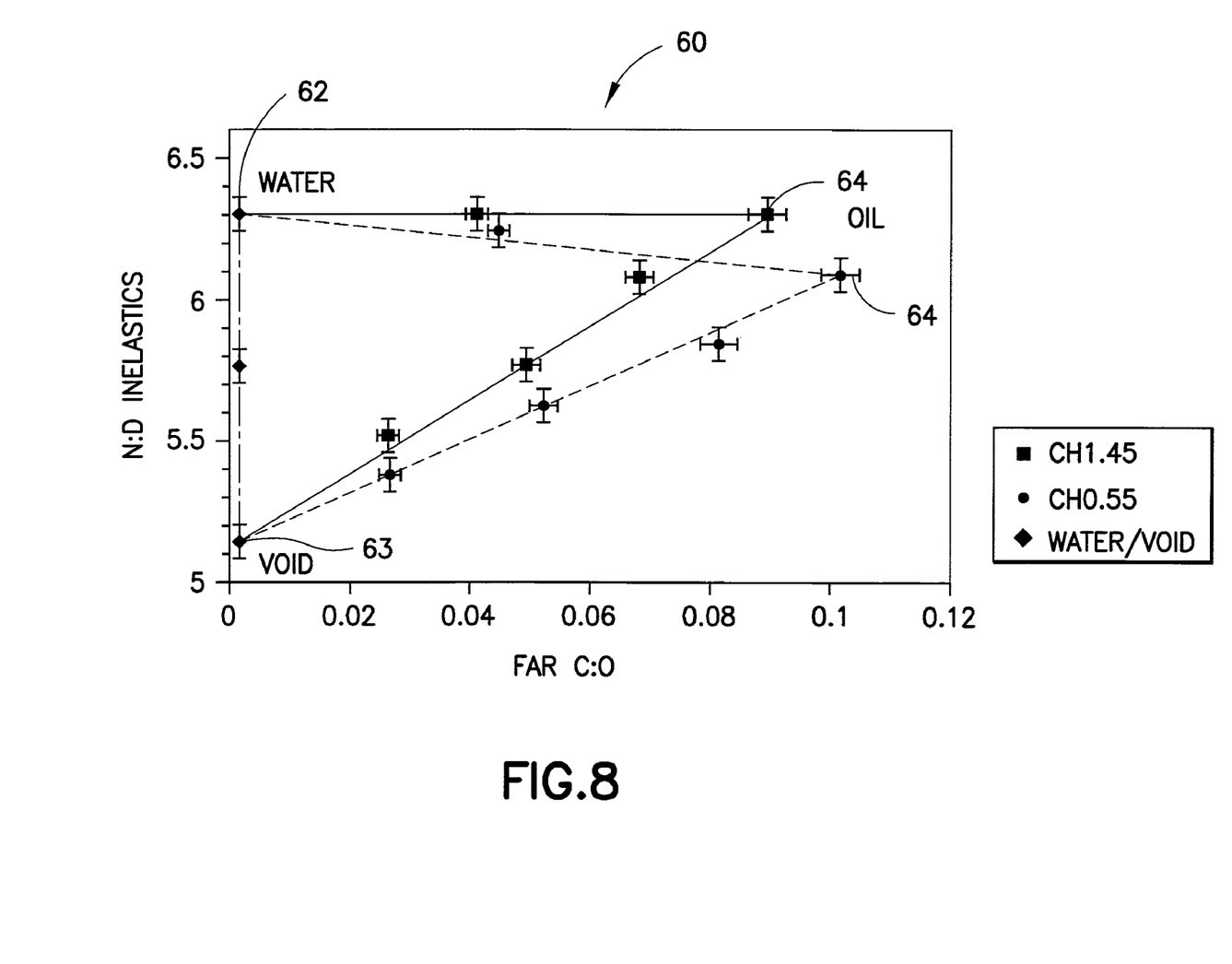
FIG. 8 is a chart is shown comparing the Inelastic near:distant ratio (using Si, Ca, O, C and Fe as before) vs. C:O ratio.
Figure 9:
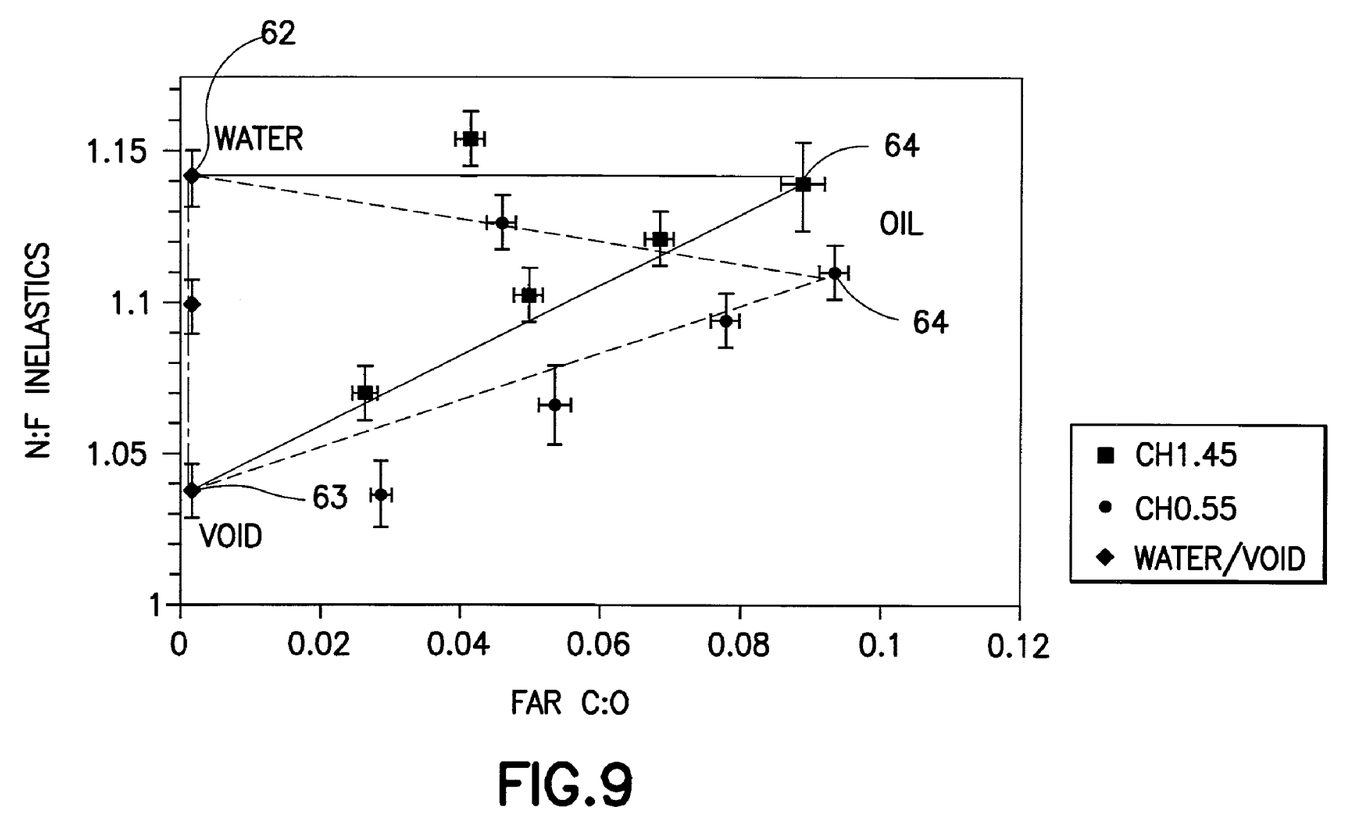
FIG. 9 is a chart is shown comparing the Inelastic near:far ratio vs. C:O ratio.

FIG. 8 shows the plot 60 obtained using the new "distant" detector spacing. As before, the plot forms a "response triangle" with water 62, void 63 and oil 64 at the vertices, and intermediate locations for oil/water and various oil/gas mixtures. Now, however, different oil compositions appear slightly displaced from each other, so that the response triangles for CH0.55 and CH1.45 do not overlay each other. For comparison, FIG. 9 shows the same plot using the standard far detector spacing instead of the longer-spaced "distant" detector. The contrast between water (density 1.0 g/cc) and void (density 0) is dramatically reduced (the water/void contrast drops from approximately 25% to approximately 10%). This is particularly noticeable in the size of the statistical error bars from the Monte Carlo simulation, which are small for the distant detector plot but comparatively much larger when using the standard far detector, despite better simulation statistics for the far detector.

The dependence on hydrocarbon composition (e.g. CH0.55 and CH1.45) should be due to the varying hydrogen content, since the carbon content is reflected in both the density and the C:O ratio. This dependence could be eliminated by using a correction based on the hydrogen fraction, or hydrogen index HI. Given that neutron transport effects are eliminated to obtain a normalized local elemental abundance by using a local ratio, it might be thought that a H:Si ratio would provide a normalized hydrogen yield. Although hydrogen does not yield inelastic gamma rays, the hydrogen and silicon capture yields are both available and have been used to determine a H:Si ratio, shown in FIG. 4 below. Although the different composition hydrocarbons both match the same curve, the response is double valued with a minimum for a HI of approximately 0.06. Therefore the H:Si capture ratio does not provide the necessary HI determination to correct the inelastic ratios.

An alternative method to determine the hydrogen content of the formation (including pore fluids) is to use a thermal neutron near:far ratio. This is commonly measured in neutron logs, which may use thermal (or epithermal) neutron detectors. In the present case, which uses a tool with gamma-ray detectors and a pulsed neutron generator, the thermal neutron rate can be determined by measuring the yield of capture gamma-rays at times when the generator is off. The capture near:far ratio reflects the formation hydrogen index, as shown by the calculated data plotted in FIG. 5. Not only is this parameter a single-valued function of HI, but the different composition hydrocarbons fall on approximately the same line (within statistical errors). The capture near:far ratio can be measured at different distances, so that either a standard far detector spacing or a longer "distant" detector spacing can be used, as confirmed by modeling studies.

The inelastic ratio data of FIG. 2 can now be corrected for hydrogen content by subtracting the capture near:far or near:distant ratio, multiplied by a suitable coefficient. This is done in FIG. 6, which shows the near:distant inelastic ratio corrected using a coefficient of 0.35. For comparison, the corresponding plot using standard far detector spacing is shown in FIG. 7; it is clear that, with the dramatically reduced contrast using standard far detector spacing, extremely high measurement precision would be preferred. This difficulty is resolved by using a longer-spaced detector, which results in better density contrast.

The invention has been described with reference to particular preferred embodiments, but variations within the spirit and scope of the invention will occur to those skilled in the art.

The invention claimed is:

1. A method comprising:
    using inelastic and capture gamma-ray count rates from two detectors in a borehole logging tool;
    determining formation water saturation and pore hydrocarbon density from a near:far inelastic gamma-ray ratio and a ratio of the carbon inelastic yield to a normalization inelastic yield; and
    transmitting the formation water saturation and pore hydrocarbon density to a surface receiver.

2. The method of claim 1 wherein the normalization element is selected from the group consisting of oxygen, silicon, calcium, iron.

3. The method of claim 1, wherein the normalization element is a combination of elements selected from the group consisting of oxygen, silicon, calcium, iron.

4. A method comprising:
    using inelastic and capture gamma-ray count rates from two detectors in a borehole logging tool; and
    determining formation water saturation and pore hydrocarbon density;
    deriving the pore carbon density from a near:far inelastic gamma-ray ratio and a ratio of the carbon inelastic yield to a normalization inelastic yield; and
    transmitting the formation water saturation and pore hydrocarbon density to a surface receiver.

5. The method of claim 4, wherein the normalization element is selected from the group consisting of oxygen, silicon, calcium, iron.

6. The method of claim 4, wherein the normalization element is a combination of measured elements selected from the group consisting of oxygen, silicon, calcium, iron.

7. The method of claim 4 wherein the atomic carbon to hydrogen ratio is derived by measuring neutron porosity.

\* \* \* \* \*